(12) United States Patent
Schnädelbach

(10) Patent No.: US 11,773,952 B2
(45) Date of Patent: Oct. 3, 2023

(54) HYDRODYNAMIC TORQUE CONVERTER AND TORSIONAL VIBRATION DAMPER FOR SAME

(71) Applicant: Schaeffler Technologies AG & Co. KG, Herzogenaurach (DE)

(72) Inventor: David Schnädelbach, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 105 days.

(21) Appl. No.: 17/442,792

(22) PCT Filed: Feb. 3, 2020

(86) PCT No.: PCT/DE2020/100065
§ 371 (c)(1),
(2) Date: Sep. 24, 2021

(87) PCT Pub. No.: WO2020/200349
PCT Pub. Date: Oct. 8, 2020

(65) Prior Publication Data
US 2022/0170539 A1 Jun. 2, 2022

(30) Foreign Application Priority Data
Apr. 5, 2019 (DE) .......................... 102019109014.8

(51) Int. Cl.
*F16H 45/02* (2006.01)
*F16F 15/134* (2006.01)

(52) U.S. Cl.
CPC ....... *F16H 45/02* (2013.01); *F16F 15/13492* (2013.01); *F16F 2232/02* (2013.01);
(Continued)

(58) Field of Classification Search
CPC ............ F16H 45/02; F16H 2045/0226; F16H 2045/0263; F16F 15/13492; F16F 2236/08
See application file for complete search history.

(56) References Cited

U.S. PATENT DOCUMENTS

2005/0199460 A1 9/2005 Maienschein et al.
2011/0287844 A1 11/2011 Steinberger

FOREIGN PATENT DOCUMENTS

DE 19920542 A1 11/1999
DE 10224874 A1 12/2002
(Continued)

*Primary Examiner* — Huan Le

(57) ABSTRACT

A hydrodynamic torque converter and a torsional vibration damper for same, having a pump wheel connected on the drive side and a turbine wheel driven thereby, wherein a torsional vibration damper and an output part are provided between a housing of the hydrodynamic torque converter and an output hub. The torsional vibration damper having an input part that can be connected to the housing by a converter lock-up clutch, and said output part being connected to the output hub, wherein an intermediate flange arranged in each case counter to a spring device effective in the circumferential direction is provided between the input part and the output part. In order to protect the spring devices against damage in a manner not affecting the installation space, an angle of rotation of the intermediate flange counter to the effect of the spring devices is limited radially inside the spring devices.

18 Claims, 2 Drawing Sheets

(52) U.S. Cl.
CPC .. *F16F 2236/08* (2013.01); *F16H 2045/0226* (2013.01); *F16H 2045/0263* (2013.01)

(56) References Cited

FOREIGN PATENT DOCUMENTS

| | | | | |
|---|---|---|---|---|
| DE | 10350935 A1 | * | 5/2004 | ............ F16H 45/02 |
| DE | 10358901 A1 | | 2/2005 | |
| DE | 102005008660 A1 | | 9/2005 | |
| DE | 102010014674 A1 | * | 11/2010 | ............ F16F 15/145 |
| DE | 102010014674 A1 | | 11/2010 | |
| DE | 112013000878 T5 | | 10/2014 | |
| DE | 102014110171 A1 | | 2/2015 | |
| DE | 102017105005 A1 | | 9/2017 | |
| WO | 9910664 A1 | | 3/1999 | |
| WO | 2010037661 A1 | | 4/2010 | |

* cited by examiner

HYDRODYNAMIC TORQUE CONVERTER AND TORSIONAL VIBRATION DAMPER FOR SAME

CROSS-REFERENCE TO RELATED APPLICATIONS

This application is the U.S. National Phase of PCT Appln. No. PCT/DE2020/100065 filed Feb. 3, 2020, which claims priority to DE 102019109014.8 filed Apr. 5, 2019, the entire disclosures of which are incorporated by reference herein.

TECHNICAL FIELD

The disclosure relates to a hydrodynamic torque converter and a torsional vibration damper for same, having a pump wheel connected on the drive side and a turbine wheel driven thereby, wherein, between a housing of the torque converter and an output hub, there is provided a torsional vibration damper having an input part that can be connected to the housing by means of a converter bridging clutch and an output part connected to the output hub.

BACKGROUND

Hydrodynamic torque converters are used in drive trains of motor vehicles to transmit torque while adapting the different speeds between a crankshaft of an internal combustion engine and a transmission input shaft of a transmission. For this purpose, the crankshaft drives a housing of the torque converter with a pump wheel, which hydrodynamically drives a turbine wheel. An idler wheel can also be provided to increase torque at low speeds. In order to prevent the torque converter from slipping at higher speeds, what is termed a converter bridging clutch can be provided between the housing and an output hub of the torque converter. Torsional vibration dampers can be provided between the converter bridging clutch and the output hub and/or between the turbine wheel and the output hub.

The document DE 10 2010 014 674 A1 shows, for example, a hydrodynamic torque converter with a torsional vibration damper arranged within its housing. The torsional vibration damper has an input part connected to a turbine wheel and a converter bridging clutch, an output part connected to an output hub, and an intermediate flange connected in series therebetween by means of spring devices. The intermediate flange carries a centrifugal pendulum.

SUMMARY

The object of the disclosure is to develop a generic hydrodynamic torque converter and a torsional vibration damper for same. In particular, the object of the disclosure is to protect the spring devices from destruction.

The object is achieved by the subject matter described herein.

The proposed hydrodynamic torque converter is used, in particular, in a drive train of a motor vehicle to transmit torque from a crankshaft of an internal combustion engine to a transmission input shaft of a transmission while adjusting possibly different speeds and to increase torque during a start-up phase of the motor vehicle. For this purpose, the torque converter contains a housing with which a pump wheel is integrated in a non-rotatable manner or can be connected by means of a separate clutch. The pump wheel hydrodynamically drives a turbine wheel. The torque introduced into the torque converter is converted via an output hub that can be or is connected to the turbine wheel, for example transferred to a transmission input shaft of a transmission, for example a multi-stage automatic transmission, in an excessive manner by means of an idler wheel.

To bypass the torque converter, for example after a completed start-up process, a converter bridging clutch integrated into the housing can be provided between the housing and the output hub. A first torsional vibration damping device is provided between the output part of the converter bridging clutch and the output hub. The turbine wheel is rotatably received on the output hub against the action of a second torsional vibration device, what is termed a turbine damper.

The two torsional vibration damping devices are provided by means of a single torsional vibration damper. Here, the input part of the torsional vibration damper is connected to the output of the converter bridging clutch, for example a plate carrier such as an outer plate carrier, and the output part is connected to the output hub. The torsional vibration damper has an intermediate flange, which is effectively arranged between the input part and the output part by means of a spring device effective in the circumferential direction.

To connect the turbine wheel to the torsional vibration damper, this is connected to the intermediate flange in a non-rotatable manner, for example riveted and centered on the output hub. To improve the torsional vibration isolation of the torsional vibration damper when the converter bridging clutch is open and closed, a centrifugal pendulum is received on the intermediate flange. The centrifugal pendulum can be matched to a single damper order due to the similar design of all pendulum masses and their pendulum bearings with predetermined pendulum tracks opposite the intermediate flange. Alternatively, two damper arrangements can be provided which are matched to the oscillation modes of the open and closed converter bridging clutch and/or to a different number of cylinders operated by the internal combustion engine. Here, for example, two sets of pendulum masses with different masses and/or different pendulum tracks provided between pendulum mass carriers and pendulum masses can be provided by means of a corresponding design of the raceways of the pendulum bearings. When the converter bridging clutch is closed, the turbine mass can serve as an additional damper mass for the intermediate flange.

The spring devices can each be formed from linearly designed helical compression springs distributed over the circumference. The helical compression springs can each be housed individually in a captive manner on a circumference. Alternatively, what are termed helical compression spring assemblies can be provided in which a plurality of helical compression springs are nested inside one another. The helical compression springs of a helical compression spring assembly can have different lengths for setting a multi-stage characteristic curve of the torsional force over the angle of rotation of the torsional vibration damper. Different helical compression springs and/or different helical compression spring assemblies can be arranged in the different circumferential directions in relation to the intermediate flange. The helical compression springs can be arranged on different diameters. Preferably, the helical compression springs of the two spring devices are arranged on the same diameter and alternately over the circumference.

According to an advantageous embodiment of the torsional vibration damper, the intermediate flange is formed from two interconnected lateral parts which are axially spaced, which receive the input part and the output part therebetween. The two lateral parts serve as pendulum mass carriers for the pendulum masses distributed over the circumference, for example in an order of two to four. The pendulum masses, for example made of a plurality of sheet metal parts, are arranged axially between the lateral parts. Lateral parts and pendulum masses have axially aligned recesses with raceways, on which a pendulum roller axially overlapping the recess rolls.

The input part and the output part can be designed as disk parts formed to be axially adjacent to one another. A lateral part facing the converter bridging clutch can be shortened radially on the inside so that a connection such as riveting can be formed between the output part of the converter bridging clutch and the input part of the torsional vibration damper. The input part can be centered on the output hub and the output part can be connected to the output hub in a non-rotatable manner. For example, the output part and the output hub can be designed in one piece, riveted to one another or connected to one another in a non-rotatable manner and with axial play by means of internal and external toothing.

In an advantageous manner, the disk parts can have loading regions arranged in one plane for the end faces of the helical compression springs. For this purpose, parts of the disk parts can be designed to be overlapping axially and radially one above the other, so that the helical compression springs are each loaded axially centrally by the input part or the output part with respect to their cross section. The end faces of the respective helical compression springs that lie opposite the loading regions of the input part or the output part in the circumferential direction are loaded by the lateral parts. For this purpose, axially aligned spring windows are provided in the lateral parts of the intermediate flange, into which the helical compression springs or helical compression spring assemblies are inserted in a captive manner and supported radially against centrifugal force. The radial walls of the spring windows serve as loading regions of the intermediate flange.

The loading regions of the input part and/or the output part can be planar or have lugs that extend in the circumferential direction and engage in the interior of at least one part of the helical compression springs. The lugs can be designed in such a way that the helical compression spring ends are pulled radially inward during loading and therefore friction between them is prevented or at least reduced radially on the outside.

When the torsional vibration damper is not loaded, the disk parts preferably have radially outwardly open recesses for the helical compression springs that are axially aligned with the spring windows, with a support that extends across the helical compression spring in the circumferential direction on at least one disk part.

In order to protect the helical compression springs from destruction, for example by blocking them, the angle of rotation of the intermediate flange is limited. In a preferred manner, the angle of rotation of the intermediate flange between the input part and the output part of the torsional vibration damper is limited, for example, to at least ±15°. It has proven advantageous here to provide the stop limits of the intermediate flange radially inside the spring devices. As a result, the disk parts of the input part and of the output part can essentially be limited to the diameter of the helical compression springs. The stops of the intermediate flange, for example spacer bolts between the two lateral parts, can be displaced further radially inward, for example in the circumferential direction between the helical compression springs. By means of these measures, pendulum masses of the centrifugal pendulum possibly received on the intermediate part can be designed and dimensioned larger without recesses for the stops with the same diameter of the torsional vibration damper, so that they enable improved torsional vibration damping due to the increased mass or an enlarged oscillation angle.

According to an advantageous embodiment of the hydrodynamic torque converter or the torsional vibration damper, one of the lateral parts, preferably the lateral part adjacent to the converter bridging clutch, can have at least one tab, preferably two to four, preferably three tabs distributed over the circumference, which are axially flared with torsional play in an axially opposite opening of an output part of the torque converter bridging clutch. A stop of the tab on the walls of the opening in the circumferential direction limits the angle of rotation of the intermediate flange with respect to the input part of the torsional vibration damper after the torsional lay has been used up. The output part can be designed, for example, as a plate carrier, in particular as an output-side outer plate carrier of the converter bridging clutch.

The angle of rotation between the intermediate flange and the output part of the torsional vibration damper can be limited in that at least one lateral part of the intermediate flange, in particular the lateral part connected to the turbine wheel, is centered and rotatably received with torsional play along the torsional play on the output hub. For this purpose, the output hub can have one or, for example, between two and four radially widened cams distributed over the circumference, which engage with torsional play in recesses in the inner circumference of the at least one lateral part.

The object is also achieved by a torsional vibration damper, in particular for a hydrodynamic torque converter having the features listed above having an input part and an output part and an intermediate flange, wherein the input part, intermediate flange and output part are arranged in series by means of helical compression springs acting in the circumferential direction and the input part and the output part are designed as axially adjacent disc parts, which are arranged between two axially spaced and interconnected lateral parts of the intermediate flange. The limitation of the torsional play to protect the helical compression springs from a block position is provided radially inside the spring device for example between an output part, for example a plate carrier of the converter bridging clutch and a lateral part of the intermediate flange or between the output hub and a lateral part of the intermediate flange.

BRIEF DESCRIPTION OF THE DRAWINGS

The disclosure is explained in more detail with reference to the exemplary embodiment shown in FIGS. 1 to 5. In the figures.

DETAILED DESCRIPTION

Figure 1:
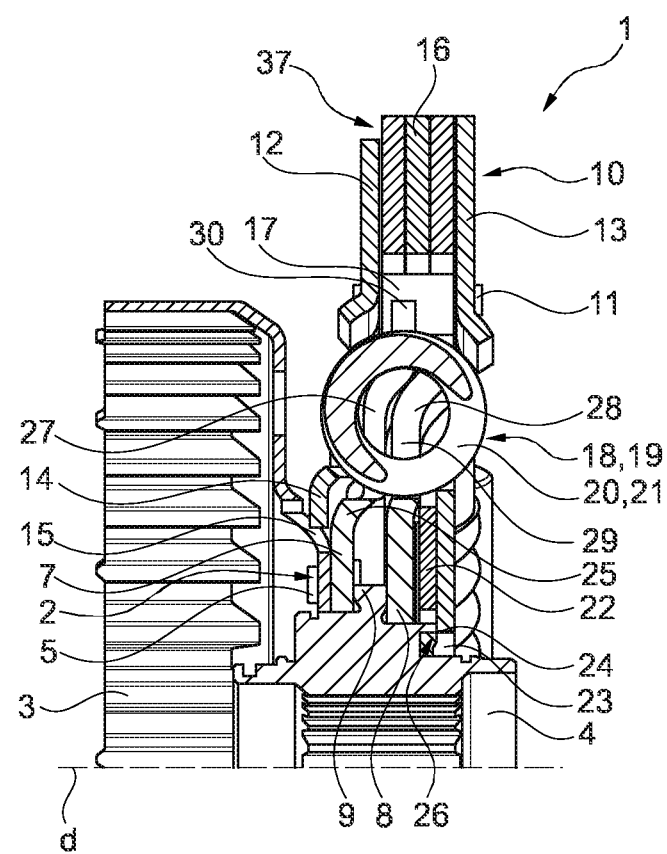
FIG. 1 shows the upper part of a torsional vibration damper arranged to be rotatable about a rotational axis, in section.

FIG. 1 shows the upper part of the torsional vibration damper 1 of a hydrodynamic torque converter (not shown in detail), which can be rotated about the rotational axis d, in section. The input part 2 is connected to the output-side plate carrier 3 of a converter bridging clutch arranged between a housing of the hydrodynamic torque converter and its output hub 4 by means of the rivets 5 distributed over the circumference. The input part 2 and the plate carrier 3 are received in a rotatable centered manner on the output hub 4. The output part 6 is connected in a non-rotatable manner to the output hub 4, for example welded. The input part 2 and output part 6 are designed as disk parts 7, 8 arranged parallel to one another. The disk part 7 is axially fixed and rotatably received by means of the annular rim 9 of the output hub 4 and is centered on the output hub 4. The disk part 8 is held in a non-rotatable manner on the annular rim 9 on the output hub 4, for example welded thereto.

The intermediate flange 10 is formed from the two axially spaced lateral parts 12, 13 connected to one another by means of the spacer bolts 11. The disk parts 7, 8 are axially received between the lateral parts 12, 13 of the intermediate flange 10. The lateral part 12 facing the converter bridging clutch is recessed radially on the inside in order to enable the connection of the plate carrier 3 to the input part 2. Tabs 14 exposed from the lateral part 12 grip axially with torsional play into the axially opposite openings 15 and thus limit the angle of rotation between the intermediate flange 10 and the input part 2.

The lateral parts 12, 13 form the pendulum mass carrier of the centrifugal pendulum 37 received on the intermediate flange 10 and receive the pendulum masses 16, which are made up of, for example, riveted sheet metal disks that are distributed over the circumference. The pendulum masses 16 are suspended by means of pendulum bearings (not shown) on the pendulum mass carrier in the centrifugal force field of the torsional vibration damper 1 rotating about the rotational axis d so that they can swing along a predetermined pendulum path. The spacer bolts 11 have stop buffers 17 to delimit the oscillation angle of the pendulum masses 16.

Spring devices 18, 19 are effective between the input part 2, the intermediate flange 10 and the output part 6. The spring devices 18, 19 are arranged in series, i.e., when the input part 2 is rotated relative to the output part 6 about the rotational axis d, depending on the direction of the applied torque, that between the input part 2 and the intermediate flange 10 and that between the intermediate flange 10 and spring devices 18, 19 effectively arranged on the output part 6 are loaded in series.

The spring devices 18, 19 are formed from linear helical compression springs 20, 21 which are distributed over the circumference and are arranged on essentially the same diameter.

The thrust washer 22, made in particular of plastic and suspended in a non-rotatable manner in the lateral part 13, delimits the axial play of the intermediate flange 10. The intermediate flange 10 is received by means of the lateral part 13 on the output hub 4 with limited torsional play and is centered. For this purpose, radially extended cams 23 are provided on the output hub 4 distributed over the circumference, which engage in recesses 24 with torsional play provided over the circumference on the inner circumference of the lateral part 13 and limit the angle of rotation of the intermediate flange 10 with respect to the output part 6 of the torsional vibration damper.

By means of the stops 25, 26 for limiting the angle of rotation by means of the tabs 14 and the openings 15 on the input side and the cams 23 and recesses 24, the angle of rotation of the intermediate flange 10 relative to the input part 2 or the output part 6 is limited, for example, to ±15° in such a way that a block position of the helical compression springs 20, 21 is avoided and damage caused thereby is excluded.

The stops 25, 26 for limiting the angle of rotation of the intermediate flange 10 are provided radially inside the spring devices 18, 19, so that the installation space outside the spring devices 18, 19 can be kept free for the dimensioning of the pendulum masses 16 and these can be provided with increased mass and/or increased oscillation angle in relation to stops arranged radially outside of the spring devices 18, 19 to limit the angle of rotation of the intermediate flange 10.

The input-side and output-side loading of the helical compression springs 20, 21 takes place by means of the radially expanded loading regions 27, 28 each in the center of the cross section of the end faces of the helical compression springs, wherein the loading regions 27, 28 of the disk parts 7, 8 each overlap in the loading direction on the disk parts 7, 8. At the loading regions 28, the lug 29, which is extended in the loading direction and engages in the interior of the helical compression springs 20, 21, is provided in order to hold down the end faces of the helical compression springs 20, 21 radially. Against the radial deflection of the helical compression springs, in particular at their end turns, the disk part 7 has projections 30 that extend the helical compression springs 20, 21 in the circumferential direction and partially overlap in the radial direction.

Figure 2:
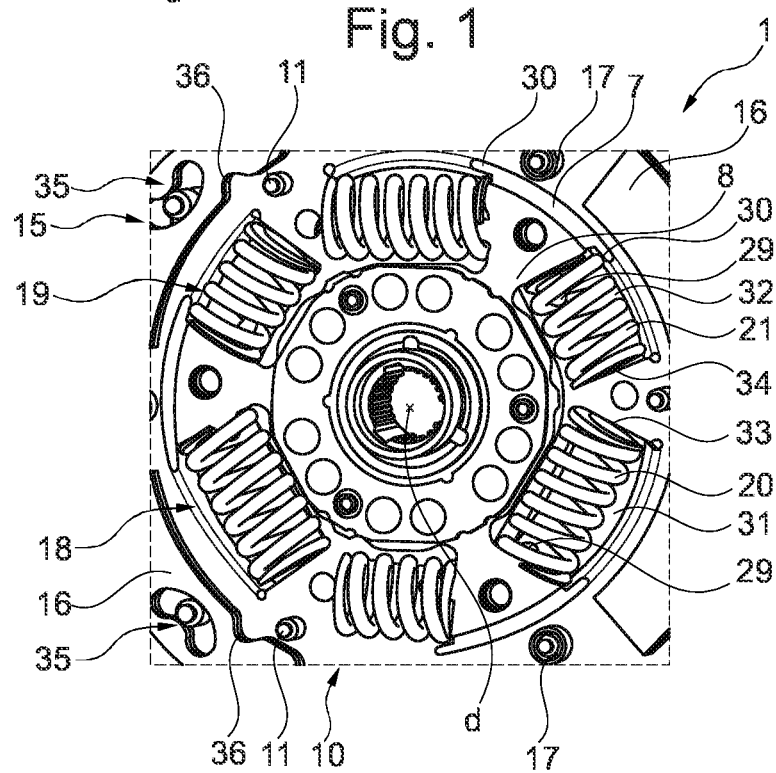
FIG. 2 shows a partial view of the torsional vibration damper from FIG. 1.

FIG. 2 shows the torsional vibration damper 1 of FIG. 1 in a partial view with the front lateral part removed with the helical compression springs 20, 21 of the spring devices 18, 19 alternately accommodated in the spring windows 31, 32 over the circumference. The loading of the helical compression springs 20, 21 provided in both directions of rotation of the intermediate flange 10 takes place by means of the radial walls 33, 34 of the spring windows 31, 32. The radial support of the helical compression springs 20, 21 takes place on the input side radially on the outside by means of the projections 30 of the disk part 7 and on the output side radially inside by means of the lugs 29 of the disk part 8.

Immediately radially outside of the helical compression springs 20, 21, the pendulum masses 16 of the centrifugal pendulum 37 are suspended in a pendulum-capable manner by means of the pendulum bearings 35 on the lateral parts 12 (FIG. 1), 13 in the centrifugal force field of the torsional vibration damper 1 rotating about the rotational axis d along a pendulum path specified by the pendulum bearings 35. As a result of the stops 25, 26 (FIG. 1) radially inside the spring devices 18, 19, the installation space radially outside the spring devices 18, 19 can be used exclusively for the pendulum masses 16 and their oscillation angle requirements. Recesses 36 are only provided for the spacer bolts 11. Some of the spacer bolts 11, here to limit the circumferential movement of the pendulum masses 16, have stop buffers 17.

Figure 3:
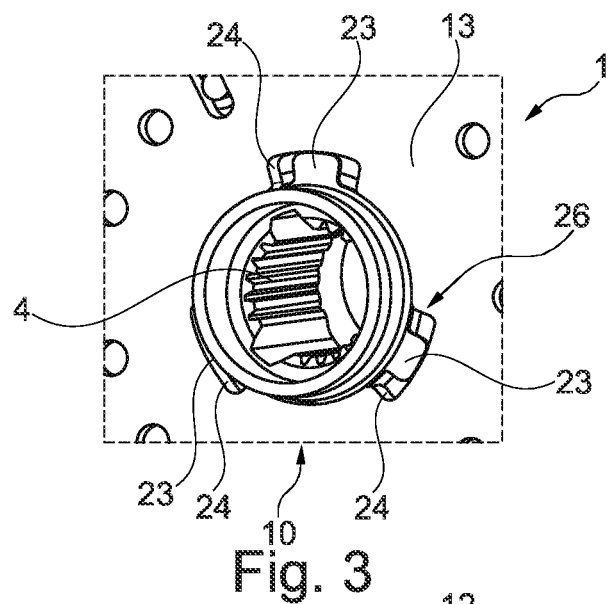
FIG. 3 shows a detail of the torsional vibration damper from FIGS. 1 and 2 in the region of the output hub.

FIG. 3 shows a detail of the torsional vibration damper 1 in the region of the output hub 4 with the stop 26 for limiting the angle of rotation between the intermediate flange 10 and the output part 6 (FIG. 1). The output hub 4, which is firmly connected to the output part and is welded, has three radially expanded cams 23 distributed over the circumference, which extend with torsional play into the recesses 24 provided on the inner circumference of the lateral part 13 of the intermediate flange 10. The torsional play that results between the cams 23 and recesses 24 enables an angle of rotation of the intermediate flange with respect to the output hub 4 and thus the output part 6 (FIG. 1) within the scope of the working range of the helical compression springs 20, 21 (FIG. 1) with a limitation before reaching their block position.

Figure 4:
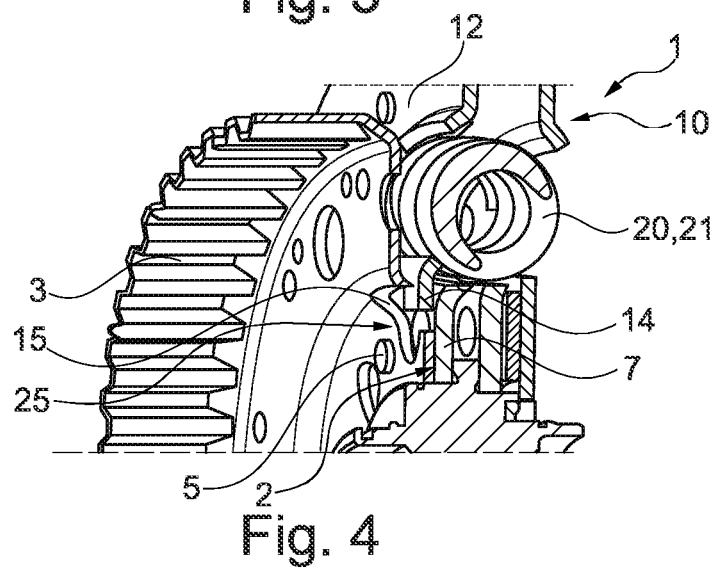
FIG. 4 shows a detail of the torsional vibration damper from FIGS. 1 and 2 in the region of the plate carrier.

FIG. 4 shows a detail of the torsional vibration damper 1 in the region of the stop 25 between the plate carrier 3 and the lateral part 12 of the intermediate flange 10. Due to the riveting of the disk part 7 of the input part 2 to the plate carrier 3 by means of the rivet 5, the stop 25 between the input part 2 and the intermediate flange 10 is effective and limits the torsional play on the input side before the helical compression springs 20, 21 reach a block position. For this purpose, tabs 14 are axially issued from the lateral part 12 of the intermediate flange 10 and are distributed over the circumference and engage with the openings 15 of the plate carrier 3 with torsional play.

Figure 5:
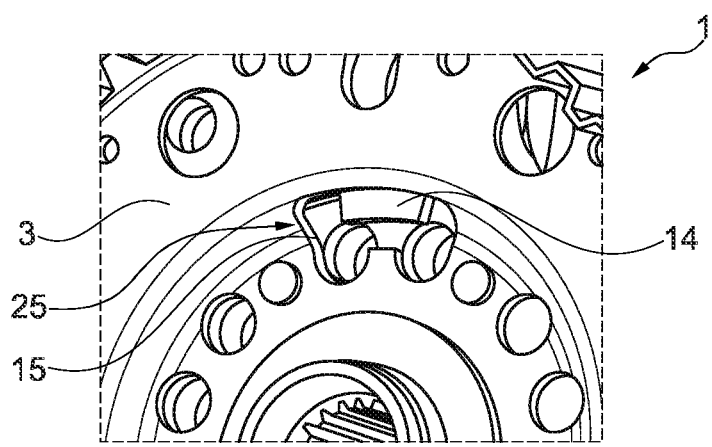
FIG. 5 shows a detail of the torsional vibration damper of FIGS. 1 and 2 in the region of the stop between the input part and the intermediate flange.

FIG. 5 shows a detail of the torsional vibration damper 1 from the perspective of the plate carrier 3 with the tab 14 of the lateral part 12 engaging in the opening 15 of the plate carrier 3 with torsional play (FIG. 1).

LIST OF REFERENCE NUMBERS

1 Torsional vibration damper
2 Input part
3 Plate carrier
4 Output hub
5 Rivet
6 Output part
7 Disk part
8 Disk part
9 Annular rim
10 Intermediate flange
11 Spacer bolt
12 Lateral part
13 Lateral part
14 Tab
15 Opening
16 Pendulum mass
17 Stop buffer
18 Spring device
19 Spring device
20 Helical compression spring
21 Helical compression spring
22 Thrust washer
23 Cams
24 Recess
25 Stop
26 Stop
27 Loading region
28 Loading region
29 Lug
30 Projection
31 Spring window
32 Spring window
33 Wall
34 Wall
35 Pendulum bearing
36 Recess
37 Centrifugal pendulum
d Rotational axis

The invention claimed is:

1. A hydrodynamic torque converter comprising:
a pump wheel connected on a drive side and a turbine wheel driven thereby, wherein a torsional vibration damper and an output part are provided between a housing of the hydrodynamic torque converter and an output hub, the torsional vibration damper having an input part that can be connected to the housing by a converter lock-up clutch, and the output part being connected to the output hub,
wherein an intermediate flange arranged in each case counter to spring devices effective in a circumferential direction is provided between the input part and the output part,
wherein an angle of rotation of the intermediate flange counter to the effect of the spring devices is limited radially inside the spring devices,
wherein the intermediate flange is formed from two axially spaced, interconnected lateral parts, which receive the input part and the output part therebetween,
wherein at least one lateral part of the intermediate flange is centered with torsional play and rotatably received along the torsional play on the output hub,
wherein the output hub has radially widened cams distributed over a circumference, which engage with torsional play in recesses recessed on an inner circumference of the at least one lateral part.

2. The hydrodynamic torque converter according to claim 1, wherein the spring devices are each formed from linearly designed helical compression springs distributed over a circumference.

3. The hydrodynamic torque converter according to claim 2, wherein the helical compression springs of the two spring devices are arranged alternately over the circumference.

4. The hydrodynamic torque converter according to claim 1, wherein the input part is centered on the output hub and the output part is connected for conjoint rotation with the output hub.

5. The hydrodynamic torque converter according to claim 1, wherein one of the lateral parts engages in an axially opposite opening of an output part of the converter lock-up clutch by at least one axially flared tab with torsional play.

6. The hydrodynamic torque converter according to claim 5, wherein the output part is designed as a plate carrier of the converter lock-up clutch.

7. A torsional vibration damper for a hydrodynamic torque converter, comprising:
an input part, an output part, and an intermediate flange, wherein the input part, the intermediate flange and the output part are arranged in series by spring devices effective in a circumferential direction,
wherein the input part and the output part are designed as axially adjacent disk parts, which are arranged between two axially spaced and interconnected lateral parts of the intermediate flange,
wherein an angle of rotation of the intermediate flange counter to the effect of the spring devices is limited radially inside the spring devices,
wherein one of the lateral parts engages in an axially opposite opening of an output part of a converter lock-up clutch by at least one axially flared tab.

8. The torsional vibration damper according to claim 7, wherein the spring devices are helical compression springs arranged alternately over a circumference.

9. The torsional vibration damper according to claim 7, wherein the input part is centered on an output hub.

10. A hydrodynamic torque converter, comprising:
an output hub;
a plate carrier of a converter lock-up clutch; and
a torsional vibration damper including:
an input part non-rotatably connected to the plate carrier;
an output part non-rotatably connected to the output hub; and an intermediate flange including two axially spaced, interconnected lateral parts, wherein the input part and the output part are arranged axially between the interconnected lateral parts of the intermediate flange;

wherein the input part, the intermediate flange and the output part are arranged in series by spring devices effective in a circumferential direction;

wherein an angle of rotation of the intermediate flange counter to the effect of the spring devices is limited radially inside the spring devices;

wherein one of the lateral parts engages in an axially opposite opening of the plate carrier via at least one axially flared tab.

11. The hydrodynamic torque converter according to claim 10, wherein the input part and the output part are designed as axially adjacent disk parts.

12. The hydrodynamic torque converter according to claim 10, wherein another of the lateral parts engages the output hub.

13. The hydrodynamic torque converter according to claim 12, wherein the output hub has radially widened cams distributed over a circumference, which engage in recesses recessed on an inner circumference of the other lateral part.

14. The hydrodynamic torque converter according to claim 10, wherein the input part is centered on the output hub.

15. The hydrodynamic torque converter according to claim 10, wherein the output hub includes an annular rim, the input part being rotatably received by the annular rim, and the output part being fixed to the annular rim.

16. The hydrodynamic torque converter according to claim 15, wherein the at least one axially flared tab is arranged radially outside of the annular rim, and an inner circumference of the other lateral part is arranged radially inside of the annular rim.

17. The hydrodynamic torque converter according to claim 10, wherein the at least one axially flared tab is arranged at an inner circumference of the one lateral part.

18. The hydrodynamic torque converter according to claim 10, further comprising pendulum masses supported by the intermediate flange, wherein the pendulum masses are arranged between the lateral parts and radially outside of the spring devices.

* * * * *